United States Patent [19]

Rizk et al.

[11] Patent Number: 4,625,012

[45] Date of Patent: Nov. 25, 1986

[54] MOISTURE CURABLE POLYURETHANE POLYMERS

[75] Inventors: Sidky D. Rizk, Westfield; Harry W. S. Hsieh, Rahway, both of N.J.

[73] Assignee: Essex Specialty Products, Inc., Sayreville, N.J.

[21] Appl. No.: 769,409

[22] Filed: Aug. 26, 1985

[51] Int. Cl.$^4$ .............................................. C08G 77/04
[52] U.S. Cl. ...................................... 528/28; 528/29; 528/38; 156/330
[58] Field of Search ............................. 528/28, 29, 38

[56] References Cited

U.S. PATENT DOCUMENTS

| | | | |
|---|---|---|---|
| 2,832,754 | 4/1958 | Jex et al. | 260/46.5 |
| 2,930,809 | 3/1960 | Jex et al. | 260/448.8 |
| 2,943,103 | 6/1960 | Jex et al. | 260/448.8 |
| 3,372,083 | 3/1968 | Evans et al. | 428/149 |
| 3,502,704 | 3/1970 | McKellar | 528/25 |
| 3,632,557 | 1/1972 | Brode et al. | 528/33 |
| 3,711,445 | 1/1973 | Chu et al. | 528/58 |
| 3,779,794 | 12/1973 | De Santis | 428/425.6 |
| 3,886,226 | 5/1975 | Asai et al. | 528/28 |
| 3,979,344 | 9/1976 | Bryant et al. | 528/22 |
| 4,062,844 | 1/1978 | Barron et al. | 260/37 |
| 4,222,925 | 9/1980 | Bryant et al. | 524/589 |
| 4,234,697 | 11/1980 | Homan et al. | 528/28 |
| 4,345,053 | 8/1982 | Rizk et al. | 525/443 |
| 4,374,237 | 2/1983 | Berger et al. | 528/28 |
| 4,555,561 | 11/1985 | Sugimori et al. | 528/28 |

*Primary Examiner*—Melvyn I. Marquis
*Attorney, Agent, or Firm*—Curtis, Morris & Safford

[57] ABSTRACT

Methods for making a moisture curable polyurethane polymer having terminal isocyanate groups and pendant alkoxysilane groups by reacting an isocyanatosilane adduct, having terminal isocyanate groups and at least one hydrolyzable alkoxy group bonded to silicon, with a polyisocyanate and a polyol; moisture curable polymers made by said methods; sealant compositions directly adherent to a non-porous substrate such as glass or metal without the use of a primer, said compositions comprising such a moisture curable polymer in combination with a filler; and methods for curing and using such sealant compositions.

18 Claims, No Drawings

MOISTURE CURABLE POLYURETHANE POLYMERS

The present invention relates to methods for making a polyurethane polymer having pendant alkoxysilane groups and isocyanate terminals, to sealant compositions comprising such a polymer in combination with one or more fillers, and to methods for curing and using such sealant compositions.

Elastomeric polyurethane polymers have heretofore been used in the art for compounding sealants or adhesives for bonding or adhering a variety of materials. Such polyurethane polymers are often prepared to have terminal isocyanate groups. On exposure to atmospheric moisture, the isocyanate groups react with water to form amino groups with the evolution of carbon dioxide. The amino groups so formed further react with available isocyanate groups to form urea linkages, thus effecting a cure of the polymer in the sealant and binding the materials to be adhered. One important use of polyurethane sealants is in the automotive industry for adhering automotive parts made of glass, such as windshields, rear windows, and the like, to a metal chassis.

While the elastomeric properties of such polyurethane sealants are particularly suitable for such uses, adhesion of the polyurethane to non-porous surfaces such as glass and metal has not always been satisfactory. Thus, U.S. Pat. No. 3,779,794 to De Santis discloses a polyurethane sealant-primer system in which an isocyanate-reactive surface primer composition is first applied to a material to be bonded, prior to application of a polyurethane sealant thereover. The primer composition is taught to contain a silane having at least one hydrolyzable group, in addition to an isocyanate-reactive group such as an amino or mercapto group, for instance. The hydrolyzable groups in the silane, such as alkoxy bonded to silicon, have been found to adhere tightly to non-porous surfaces such as glass or metal, presumably by hydrolytic reactions with water molecules at the glass or metal surfaces to form siloxane (—Si—O—Si—) bonds. A further possibility is the direct reaction of the alkoxysilane, before or after hydrolysis to form an intermediate silanol, with Si-OH groups present in a glass surface, again to form siloxane linkages.

U.S. Pat. Nos. 3,632,557 to Brode et al., 3,979,344 to Bryant et al., and 4,222,925 to Bryant et al., all incorporated herein by reference, teach sealant compositions comprising silicone-terminated polyurethane polymers prepared by the reaction of (1) an isocyanate-terminated polyurethane prepolymer with (2) a compound having an isocyanate-reactive group (such as an amino group) and a silane group, more specifically an alkoxysilane group having at least one hydrolyzable alkoxy group bonded to silicon. Upon reaction of the prepolymer and the silicon compound, alkoxysilane terminals are introduced into the polyurethane prepolymer. The resulting silicon-terminated polymers are also moisture curable and can be used effectively as adhesives on non-porous surfaces such as metal or glass.

A further variation of this development is taught in U.S. Pat. No. 4,345,053 to Rizk et al., also incorporated herein by reference. This patent also teaches a moisture curable silicon-terminated organic polymer prepared by the reaction of (1) an isocyanato organosilane having at least one hydrolyzable alkoxy group bonded to silicon with (2) a polyurethane prepolymer having terminal active hydrogen atoms.

U.S. Pat. No. 3,372,083 to Evans et al. teaches the reaction of a diisocyanate with an aminopropyltriethoxysilane to form an adduct which is subsequently added to a polyurethane sealant composition.

U.S. Pat. No. 3,502,704 to McKellar shows the reaction of polyisocyanates with silanes for use in the preparation of polyurethanes.

U.S. Pat. No. 3,711,445 to Chu et al. teaches reacting a polyol and a silane, with the subsequent addition of polyisocyanate to the reaction.

U.S. Pat. No. 3,886,226 to Asai et al. mentions polyurethane compositions containing "the reaction product of an aminosilane compound with an isocyanate" in the Abstract. However, in the three embodiments disclosed in the patent, in only one is an aminosilane compound reacted with a polyisocyanate. This product is used as a primer for a polyurethane coating.

While silicon terminated polymers of the type described earlier herein have the advantage of bonding tenaciously to glass or metal without the use of a primer, they suffer the disadvantage that the cured polymers, because of the large number of siloxane (—Si—O—Si—) bonds formed by the curing reaction from hydrolyzable alkoxysilane groups, lose some of the desirable characteristics of a moisture cured isocyanate terminated polyurethane polymer.

It is an object of the present invention to develop polymers, and sealants containing such polymers, which retain desirable polyurethane polymer characteristics while still permitting good adhesion directly to non-porous surfaces such as glass or metal without the need for first priming such surfaces.

A feature of the present invention is a polymer having isocyanate terminals and pendant silane groups. Sealants made by moisture curing a polymer having such pendant alkoxysilane groups are distinguished from prior art sealants made by curing polymers having terminal alkoxysilane groups by superior adhesion to non-porous surfaces.

Such a polymer having pendant silane groups is made by a two-step reaction. In a first step a polyisocyanate having at least three isocyanate groups is reacted with less than an equivalent amount of an alkoxysilane having a terminal group containing active hydrogen atoms reactive with isocyanato groups. The product of this reaction is an isocyanatosilane having at least two unreacted isocyanato groups as well as at least one site where an isocyanato group has reacted with active hydrogen atoms of the alkoxysilane to introduce an alkoxysilane function. In the second step of the reaction, such an isocyanatosilane is mixed with additional polyisocyanate having at least two isocyanato and the mixture is reacted with a polyol to form a polyurethane prepolymer having terminal isocyanato groups and pendant alkoxysilane groups.

The first reaction step according to the present invention forms isocyanatosilane adducts which are the reaction product of a polyisocyanate and an organofunctional silane such as an amino- or mercapto-alkoxysilane of the formula

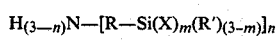

or

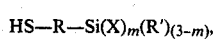

wherein R is a divalent organic group, preferably alkylene having 1 to 4 carbon atoms, R' is hydrogen or alkyl, suitably alkyl having 1 to 4 carbon atoms, X is an hydrolyzable alkoxy group, suitably having from 1 to 4 atoms, m is an integer from 1 to 3, and n is 1 or 2. It will be evident from the formulas that primary and secondary monoamines as well as mercaptans are defined. Preferred reagents are gamma-mercaptopropyl-trimethoxysilane and N,N-bis[(3-trimethoxysilyl)propyl]amine.

The polyisocyanate used in the first step should have at least three isocyanate groups per molecule and is reacted with such an amount of primary aminosilane, secondary aminosilane (including bis-silane secondary amino compounds), or mercaptosilane as will leave at least two unreacted isocyanate groups per molecule in the reaction product. Preferably one equivalent of the alkoxysilane reagent having active hydrogen atoms is reacted with one mole of the polyisocyanate, the latter representing three or more equivalents of isocyanate groups. A preferred polyisocyanate is the aliphatic triisocyanate made by reacting three moles of hexamethylene diisocyanate with one mole of water. Such a product is commercially available as "Desmodur N 100".

The polyisocyanate and alkoxysilane are reacted under anhydrous conditions at a temperature between room temperature (about 20° C.) and about 80° C. Depending on the reagents, an exotherm may develop so that no external heating is required. Indeed, cooling may be necessary. The reaction is generally complete within two hours and may be catalyzed with a tin catalyst, suitably a tin salt such as a tin carboxylate, if desired.

The reaction is suitably carried out in an inert liquid diluent or carrier. While any of the conventional inert organic solvents such as the benzene, toluene, xylene and other hydrocarbons or halohydrocarbons can be employed, it is convenient to use a compound having plasticizing properties. Ultimately, the isocyanatosilane adduct formed in this first step, after further reaction, is to be compounded into a sealant composition containing a plasticizer. Hence, the use of a plasticizer as a carrier or diluent in the first reaction step results in the formation of a reaction mixture which can be used directly in the second step of the method of the invention to form further reaction mixtures suitable for compounding directly into sealants, without any need for isolating the active reaction products from the reaction mixtures.

In the second step of the method, the isocyanatosilane adduct is mixed with a further polyisocyanate having at least two isocyanato groups, preferably a diisocyanate, and the mixture is reacted with a polylol to form the moisture curable polyurethane polymer of the invention. In this further reaction, the same polyisocyanates and polyhydroxy compounds may be employed as is taught in Brode et al. U.S. Pat. No. 3,632,557 for formation of the isocyanate terminated polyurethane polymers then taught.

Thus, exactly the same polyols may be employed as in the prior art, e.g. polyester polyols including lactone polyols prepared by the polymerization of lactones, compounds such as castor oil, polyester polyols formed, for example, by the reaction of an alkylene glycol with a dicarboxylic acid, and, particularly, polyether polyols. The latter may be prepared by forming alkylene oxide adducts of the polyester polyols and lactone polyols discussed above, or by the reaction of alkylene oxides with materials such as castor oil. The preferred polyether polyols, however, are polyoxyalkalene polyols, e.g. polyoxalkylene diols prepared, for example, by the homopolymerization or copolymerization of materials such as ethylene oxide and propylene oxide. Polyoxyalkylene triols, for example linear compounds having pendant hydroxy groups or having branched polyether chains, may also be employed as starting compounds in admixture with diols.

The organic polyisocyanates which are reacted in excess with such polyols and with the isocyanatosilanes in the second step of the present invention for formation of the polymers of the present invention are those also used in the Brode et al. patent. That is they are aliphatic, cycloaliphatic, araliphatic, or aromatic polyisocyanates, suitably di-and/or tri-isocyanates. Particularly preferred materials for use according to the present invention are diphenylmethane-4,4'-diisocyanate having aromatic characteristics, the cycloaliphatic diisocyanate 3-isooyanatomethyl-3,5,5-trimethylcyclohexyl isocyanate (isophorone diisocyanate), and dicyclohexyl-4,4'-methane diisocyanate. Mixtures of two or more of these preferred materials are also preferred for use in the present invention.

The polyols employed in the second step reaction generally have a molecular weight between about 500 and about 6000 and have hydroxyl equivalent weights between 50 and 2000. The preferred polyoxyalkylene polyols, such as polyoxypropylene, have hydroxyl equivalent weights between 200 and 2000. These materials are reacted with excess isocyanate and isocyanatosilane until the isocyanate content in the polymer is close to the theoretical value, as determined by titrating the free isocyanato groups in a sample of the polymer with dibutylamine. The resulting polymers having terminal isocyanato groups have weight average molecular weights between about 2000 and about 10000. The preferred polymers have a molecular weight between about 2500 and 6000 and have a moderate viscosity.

The number of pendant alkoxysilane groups present in the isocyanato-terminated polymer of the present invention represents between 2 and 50 equivalent percent, preferably between 2 and 35 percent, and more preferably between 5 and 15 equivalent percent, of the total isocyanato groups theoretically available in the system prior to the reactions of steps one and two. That is, of the total isocyanato groups contributed by the polyisocyanate (usually a triisocyanate) which is reacted with an organosilane in step one to form an adduct and by the polyisocyanate (usually a diisocyanate) reacted with this adduct and a polyol in step two, between 2 and 50 equivalent percent are converted by the reaction of step one into pendant alkoxysilane groups. Such percentages will retain sufficient isocyanate groups in the final prepolymer reaction product for moisture curing to give the desired and required toughness and elastomeric character of a polyurethane polymer. On the other hand, sufficient alkoxysilane pendant groups will be introduced into the polymer matrix for direct adhesion to a porous surface, such as glass or metal, after hydrolysis and condensation in the presence of moisture. As mentioned earlier, increasing the number of isocyanate groups which are reacted with the organofunctional silane will ensure good adhesion, but at an undesirable loss of the desired polyurethane character in the final product.

The reaction between the polyisocyanate and the organofunctional silane in step one and the subsequent reaction between the isocyanatosilane, polyisocyanate, and polyol in step two are carried out under anhydrous conditions, preferably under an inert atmosphere such as a nitrogen blanket, to prevent premature hydrolysis of the alkoxysilane groups and/or crosslinking of the isocyanate groups by atmospheric moisture. The second reaction step is suitably carried out at a temperature between 0° C. and 150° C., preferably between 25° C. and 80° C., until the residual isocyanate content determined by titration of a sample is very close to the desired theoretical value.

The stannous salts of carboxylic acids, such as stannous octoate, stannous oleate, stannous acetate, and stannous laurate are known as catalysts for the formation of urethanes and can be used in steps one and two. Also, dialkyltin dicarboxylates such as dibutyltin dilaurate and dibutytin diacetate are known in the art as urethane catalysts, as are tertiary amines and tin mercaptides. The amount of catalyst employed is generally between 0.005 and 5% by weight of the mixture catalyzed, depending on the nature of the isocyanate.

In the polymer formed by the method of the invention, isocyanate groups, when subjected to atmospheric moisture, will form amino groups with the evolution of carbon dioxide. These amino groups will further react with available isocyanate groups to form a substituted urea structure. Amino groups formed during the course of condensation of the polymer will also enhance the hydrolysis of alkoxy groups present in the silane terminals and condensation thereof to form polysiloxane linkages. After moisture curing, the final macromolecule will contain a complex network of polyurethane/polyurea/polysiloxane linkages.

The presence of the polyurethane/polyurea network in the cured sealant will lend typical polyurethane properties of toughness and elasticity to the cured polymer system, whereas the crosslinks and cures derived from the grafted pendant alkoxysilane groups present within the uncrosslinked polymer will promote tenacious adhesion of the cured polymer system to non-porous surfaces such as glass or metal without the use of any primer system.

Although the polymer prepared according to the present invention and sealants made therewith will cure slowly when exposed to atmospheric moisture, for example at room temperature, to cause crosslinking of the isocyanate groups and hydrolysis and condensation of the alkoxysilane groups, such a cure rate can be enhanced by combining the polymer (or sealant) with water just prior to application to surfaces to be adhered. The polymer/water mixture starts to crosslink and cure immediately. Thus, a typical atmospheric cure at room temperature requires at least about three days for formation of an adhesive seal and about seven days for a cure to full strength, but can be accelerated by the addition of water to a cure sufficient for adhesion in a few hours, for example about six hours, with a full cure of the polymer mixture or sealant in about 24 hours. Such a system is of particular interest for use in the automotive industry for the quick mounting of glass components such as windshields into the body of an automobile. For ease in combining with the sealant compositions, the water is conveniently incorporated in the form of a paste made from water and one of the filler materials desirable to be included in the sealant composition for other purposes. For example, such pastes can be made from clay and water in proportions sufficient to give the paste the viscosity and flow characteristics required for a particular application.

Any amounts of water added to the sealant compositions in this fashion will accelerate the curing rate to some degree, with complete curing occurring subsequently in the presence of atmospheric moisture. Acceleration of the cure will be the greatest if such an amount of water is added as will react with substantially all unreacted isocyanate and unhydrolyzed alkoxysilane groups present in the sealant composition. However, there is some uncertainty in the art whether water in such curing reactions should be added in a theoretically equivalent amount (two equivalents per mole of water) or in a smaller proportion. This uncertainty results in part from the fact that the reaction of water with isocyanate groups produces amino groups which are themselves reactive with further isocyanate groups. Accordingly, no hard and fast rules concerning the amount of water to be added can be laid down. Preferably the amount of water used should be determined on the case by case basis depending on the rapidity of cured desired in any given particular use of the sealant.

Curing of the resulting polymer by moisture, and particularly the rate of hydrolysis of the alkoxysilane groups present therein, is accelerated with catalysts known to promote the condensation of silanols. These materials include metal salts, such as tin carboxylates, organosilicon titantates, alkyltitanates, and the like. Bismuth octoate is a preferred catalyst according to the present invention. The catalysts are preferably employed in an amount between 0.1 and 1 percent by weight of the polymer, preferably between about 0.2 and 0.6 percent by weight. Such catalysts are suitably present in sealant compositions comprising the polymer of the invention as a component therein.

For formulating sealant compositions, the polymer mixtures of the invention are combined with fillers and additives known in the prior art for use in elastomeric compositions. By the addition of such materials, physical properties such as viscosity, flow rate, sag, and the like can be modified. However, to prevent premature hydrolysis of the moisture sensitive groups of the polymer, the filler should be thoroughly dried before admixture therewith. Exemplary filler materials and additives include materials such as carbon black, titanium dioxide, clays, calcium carbonate, surface treated silicas, ultraviolet stabilizers, antioxidants, and the like. This list, however, is not comprehensive and is given merely as illustrative.

As mentioned earlier, such sealants may also contain one or more plasticizers to modify rheological properties to a desired consistency. Such materials should be free of water, inert to isocyanate groups, and compatible with the polymer. Suitable plasticizers are well known in the art and include dioctyl phthalate, dibutyl phthalate, a partially hydrogenated terpene commercially available as "HB-40", and still other materials.

A better understanding of the present invention and of its advantages will be had be referring to the following specific examples, given by way of illustration. In the following Examples, the polyether diol employed, unless otherwise indicated, is a polyoxypropylene diol having an average molecular weight of about 2000 and commercially available under the tradename "Pluracol P 2010". Unless otherwise indicated, references in the Examples to a polyether triol are to a polyoxypropylene triol having an average molecular weight of about 4000 and commercially available under the tradename "Pluracol TPE-4542". The triol is prepared by the polymerization of propylene oxide onto a trihydric starting material such as glycerin or trimethylol propane.

Following examples 1-3 refer to formation of an adduct of a triisocyanate and an organofunctional silane having hydrolyzable alkoxy groups.

EXAMPLE 1

An isocyanatosilane adduct formed between a triisocyanate and a mercaptosilane was prepared by adding 570.0 g (1.0 mol) of "Desmodur N-100" (a reaction product of three moles of hexamethylene diisocyanate with one mole of water, manufactured by Mobay Chemical Corporation) to a mixture of 196.2 g (1.0 mol) of gamma-mercaptopropyltrimethoxy silane, 135.2 g of 2-ethylhexyl diphenyl phosphate as a plasticizer, and 0.04 g of a dialkyltin dicarboxylate catalyst commercially available under the tradename "Formrez UL-28", and reacting at 85° C. for about two hours in a reaction vessel under anhydrous conditions. The isocyanate content of the final reaction mixture was 9.3% by weight.

EXAMPLE 2

An isocyanatosilane adduct formed between a triisocyanate and a secondary amino bis-alkoxysilane was prepared by adding 89.9 g (0.263 mol) of N,N-bis[(3-trimethoxysilyl) propyl]amine to a mixture of 150.1 g (0.263 mol) of "Desmodur N-100" and 60.0 g of 2-ethylhexyl diphenyl phosphate in a reaction vessel and vigorously stirring for 30 minutes. The isocyanate content of the resulting reaction mixture was 7.1% by weight.

EXAMPLE 3

An adduct was formed between a tri-isocyanate and a secondary amino bis-alkoxysilane was synthesized by adding 341.3 g (1.0 mol) of N,N-bis[(3-trimethoxysilyl)-propyl] amine to a mixture of 975.0 g (1.0 mol.) of "Mondur CB-75" (a 75% solution of an adduct formed between 3 moles of toluene diisocyanate and 1 mole of 1,1,1-tris(hydroxymethyl)propane in ethyl acetate, manufactured by Mobay Chemical Corporation) and 275.1 g of 2-ethylhexyl diphenyl phosphate. The reaction was carried out without heating for 30 minutes with vigorous stirring and cooling with water. The isocyanate content of this reaction mixture was 5.00%.

Examples 4-6 illustrate the formation of polyurethane polymers from adducts like those of Examples 1-3, from a polyisocyanate having at least two isocyanato groups, and from a polyol.

EXAMPLE 4

A polyurethane prepolymer containing pendant silane groups was synthesized by copolymerizing a diisocyanate, a polyether diol, a polyether triol, and the isocyanatosilane of Example 1. 179.4 g (0.18 eq.) of a polypropylene ether diol (M.W.=2,000), 243.9 g (0.16 eq.) of a polypropylene ether triol (M.W.=4,500), and 13.2 g of an alkylnaphthalene plasticizer commercially available as "Kenplast G" were mixed and heated to 45° C. in a reaction vessel under anhydrous conditions. 40.2 g (0.086 eq.) of the isocyanatosilane of Example 1 and 68.0 g (0.540 eq.) of premelted diphenylene methane-4,4'-diisocyanate were added to this mixture. When the reaction mixture was well mixed, 0.01 g of stannous octoate was added. After the temperature reached 70° C., by exothermic heating, the mixture was then brought to 75° C. by heating and kept at this temperature for 15 minutes. 58.5 g of "Kenplast G", 212.6 g of 2-ethylhexyl diphenyl phosphate, and 8.2 g of diethyl malonate were now charged into the reaction vessel. The isocyanate content of the final reaction mixture was 1.40% by weight. Its viscosity at 25° C. was 24,000 cps.

EXAMPLE 5

A polyurethane prepolymer containing pendant silane groups was prepared by copolymerizing a diisocyanate, a polyether diol, a polyether triol, and the isocyanatosilane of Example 2. 179.4 g (0.18 eq.) of a polypropylene ether diol (M.W.=2,000), 243.9 g (0.16 eq.) of a polypropylene ether triol (M.W.=4,500), and 13.2 g of an alkylnaphthalene plasticizer commercially available as "Kenplast G" were mixed and heated to 45° C. in a reaction vessel under nitrogen. 40.5 g (0.071 eq.) of the silane-containing polyisocyanate of Example 2 and 70.2 g (0.557 eq.) of premelted diphenylene methane-4,4'-diisocyanate were added to this mixture. After these ingredients were uniformly mixed in the reactor, 0.03 g of stannous octoate was added as a catalyst. Stirring was continued without heating. When the exotherm peak of the reaction was reached, a mixture of 58.8 g of "Kenplast G", 213.6 g of 2-ethylhexyl diphenyl phosphate, and 8.3 g of diethyl malonate was charged to the reactor and mixed. The isocyanate content of the final reaction mixture, having a viscosity of 17,000 cps at 25° C., was 1.30% by weight.

EXAMPLE 6

A polyurethane prepolymer containing pendant silane groups was synthesized in a similar fashion as the one in Example 5. 179.4 g (0.18 eq.) of a polypropylene ether diol (M.W.=2,000), 243.9 g (0.16 eq.) of a polypropylene ether triol (M.W.=4,500), and 13.2 g of "Kenplast G" were mixed and heated to 45° C. in a reaction vessel under nitrogen. 56.5 g (0.071 eq.) of the isocyanatosilane of Example 3 and 70.2 g (0.557 eq.) of diphenylene methane-4,4'-diisocyanate were added to the above mixture. When they were uniformly mixed in the reactor, 0.03 g of stannous octoate was added as a catalyst. Stirring was continued without heating. When the peak exotherm was reached, a mixture of 58.8 g of "Kenplast G", 194.3 g of 2-ethylhexyl diphenyl phosphate, and 8.2 g of diethyl malonate was blended into the reaction mixture in the reactor. The viscosity at 25° C. and isocyanate content of this final reaction mixture were respectively 28,000 cps and 1.30% by weight.

Examples 7-9 illustrate the formulation of sealants from polymers like those of Examples 4-6.

EXAMPLE 7

A moisture curable sealant composition was prepared under anhydrous conditions by first degassing 1140.0 parts by weight of the prepolymer of Example 5 in a planetary mixer for 10 minutes and then mixing with 246.8 parts of dried carbon black and 493.4 parts of dried clay for twenty minutes under a reduced pressure of 25 inches of mercury. At this point, a mixture of 4.1 parts of bismuth octoate and 82.4 parts of dried toluene was added to the mixer. Mixing was carried out under reduced pressure for 10 minutes, then a mixture of 10.3 parts of gamma-methacryloxypropyl trimethoxysilane and 82.4 parts of dried toluene was charged to the planetary mixer and mixed for an additional 10 minutes under reduced pressure. The sealant compounded in this manner was filled into sealant tubes. This sealant showed good accelerated storage stability on exposure to 130° F. for 3 days. The lap shear strength of the sealant was tested by bonding two ceramic-glazed glass plates, each 1 inch×5 inches×0.25 inch, with a sealant bead 1 inch long×¼ inch wide×5/16 inch high applied from a sealant tube along one of the 1 inch edges of the glass plates. The glass plates sandwich the sealant and compress its height to ⅛ inch. The samples are allowed to cure at room temperature at 50 percent relative humidity for several days and are then separated by pulling in a plane parallel to the plane of the bead. In this test, the sealants of the example developed a lap shear strength of 400 psi, with cohesive failure within the sealant bead after a 3 day cure at room temperature. A similar value of lap shear strength also was obtained for the samples on exposure to a 100% relative humidity and 100° F. in a humidity box for seven days after a 3 day room temperature cure. These results indicate that this sealant has excellent adhesion to the ceramic-glazed glass and hydrolytic resistance when exposed to high humidity and high temperatures.

EXAMPLE 8

A further moisture curable sealant was prepared from the prepolymer of Example 6 using the method of compounding described in Example 7 above. 1140 parts of the prepolymer in Example 6 were degassed in a planetary mixer for 10 minutes and compounded with 246.6 parts of dried carbon black and 493.4 parts of dried clay for 20 minutes under a reduced pressure of 25 inches of mercury. Then a mixture of 4.1 parts of bismuth octoate and 82.4 parts of dried toluene was added and mixing was continued for an additional 10 minutes under vacuum. Finally, 10.3 parts of gamma-methacryloxy propyl trimethoxysilane and 82.4 parts of dried toluene were added and the resulting mixture was again mixed for 10 minutes under the reduced pressure. The compounded sealant was filled into sealant tubes and sealed in pouches. This moisture curable sealant was stable in the accelerated storage test at 130° F. for 3 days. It adhered to ceramic-glazed glass plate in 3 days at room temperature and 50 percent relative humidity and its adhesion to the substrate survived the hydrolytic resistance test at 100° F. and 100 percent relative humidity.

EXAMPLE 9

A moisture curable sealant was prepared from the prepolymer of Example 4 using the method of compounding described in Example 7 above. 1140 parts of the prepolymer in Example 4 were degassed in a planetary mixer for 10 minutes and compounded with 493.4 parts of dried clay and 246.6 parts of dried carbon black for 20 minutes under a reduced pressure of 25 inches of mercury. Then 8.3 parts of bismuth octoate and 82.6 parts of dried toluene were added and mixing was continued under reduced pressure for 10 minutes. Finally, 10.3 parts of gamma-methacryloxy propyltrimethoxy silane and 82.6 parts of dried toluene were added and the resulting mixture was again mixed for 10 minutes under reduced pressure. The sealants compounded in this manner were filled into sealant tubes and sealed in pouches. This moisture curable sealant was stable on the accelerated storage test at 130° F. for 3 days. The sealant of the example developed a lap shear strength of 480 psi with cohesive failure within the sealant bead in a 3 day cure at room temperature. Its adhesion to ceramic glass plate survived the hydrolytic resistant test at 100° F. and 100 percent relative humidity.

The following Example illustrates the accelerated cur of the sealants of the invention in the presence of water.

EXAMPLE 10

A fast curing sealant composition was prepared by combining and thoroughly mixing 240 g (0.0415 equivalent) of the sealant of Example 7, comprising fillers combined with a prepolymer of Example 5, with 0.06 g of a homogeneous paste comprising one part of clay and two parts of water. The mixture was degassed, filled into a sealant tube, and was ready for immediate use.

The sealant so compounded adhered to a glass substrate after about 5 hours, was cured to full strength in about 24 hours, and passed the aforementioned environmental test requiring exposure to 100% relative humidity at 100° F. for seven days.

What is claimed is:

1. A method for making a moisture curable polyurethane polymer having terminal isocyanate groups and pendant silane groups having at least one hydrolyzable alkoxy group bonded to silicon, which method comprises reacting
   (1) an isocyanatosilane adduct having at least two isocyanato groups and
   (2) an isocyanate different from (1) and having at least two isocyanato groups with
   (3) a polyol,
   said isocyanatosilane adduct being the reaction product of an isocyanate having at least three isocyanato groups with an organofunctional alkoxysilane.

2. A method as in claim 1 wherein the number of said pendant silane groups is from 2 to 50 equivalent percent of the total number of isocyanato groups theoretically available in said isocyanate having at least three isocyanato groups and said isocyanate (2) having at least two isocyanato groups.

3. A method for making a moisture curable polyurethane polymer having terminal isocyanate groups and pendant silane groups having at least one hydrolyzable alkoxy group bonded to silicon, which method comprises reacting
   (1) an isocyanatosilane adduct having at least two isocyanato groups and
   (2) an isocyanate different from (1) and having at least two isocyanato groups with
   (3) a polyether polyol,
   said isocyanato adduct being the reaction product of an isocyanate having at least three isocyanato groups with an organofunctional mercaptoalkoxysilane or aminoalkoxysilane, the number of said pendant silane groups being from 2 to 50 equivalent percent of the total number of isocyanato groups theoretically available in said isocyanate having at least three isocyanato groups and said isocyanate (2) having at least two isocyanato groups.

4. A moisture curable polyurethane polymer made by the method of claim 2.

5. A moisture curable polyurethane polymer made by the method of claim 3.

6. A method as in claim 3 wherein said isocyanate having at least three isocyanate groups is an aliphatic triisocyanate made by reacting three moles of hexamethylene diisocyanate with one mole of water.

7. A moisture curable polyurethane polymer made by the method of claim 6.

8. A method as in claim 6 wherein said polyether polyol is a polyoxyalkylene polyol.

9. A moisture curable polyurethane polymer made by the method of claim 8.

10. A method as in claim 1 wherein said organofunctional silane is a mercaptoalkoxysilane of the formula $$HS-R-Si(X)_m(R')_{(3-m)}$$

or an aminoalkoxysilane of the formula $$H_{(3-n)}N-[R-Si(X)_m(R')_{(3-m)}]_n,$$

where R is a divalent organic group, R' is hydrogen or alkyl, X is an hydrolyzable alkoxy group, m is any integer from 1 to 3, and n is 1 or 2.

11. A method as in claim 10 wherein said organofunctional silane is
N,N-bis[(3-trimethoxysilyl)propyl]amine.

12. A method as in claim 10 wherein said organofunctional silane is gamma-mercaptopropyl trimethoxy silane.

13. A method as in claim 1 wherein said polyol is a polyether polyol.

14. A method as in claim 1 wherein said polyether polyol is a mixture of a polyether diol and a polyether triol.

15. A method as in claim 14 wherein said polyether diol is a polyoxyalkylene diol and said polyether triol is a polyoxyalkylene triol.

16. A moisture curable polyurethane polymer made by the method of claim 1.

17. A moisture curable sealant composition comprising a polymer as in claim 16 in combination with at least one filler.

18. The method of accelerating the moisture cure of a sealant composition as in claim 17 which comprises mixing said sealant composition with a paste containing filler and sufficient water to react with isocyanate and alkoxysilane groups present in said composition.

* * * * *